(12) United States Patent
de Queiroz

(10) Patent No.: US 6,738,524 B2
(45) Date of Patent: May 18, 2004

(54) HALFTONE DETECTION IN THE WAVELET DOMAIN

(75) Inventor: Ricardo L. de Queiroz, Pittsford, NY (US)

(73) Assignee: Xerox Corporation, Stamford, CT (US)

(*) Notice: Subject to any disclaimer, the term of this patent is extended or adjusted under 35 U.S.C. 154(b) by 572 days.

(21) Appl. No.: 09/738,477

(22) Filed: Dec. 15, 2000

(65) Prior Publication Data

US 2002/0106125 A1 Aug. 8, 2002

(51) Int. Cl.[7] .................................................. G06K 9/46
(52) U.S. Cl. ........................ 382/240; 382/254; 358/3.06
(58) Field of Search ................................ 382/173, 191, 382/218, 232, 240, 254, 260, 263, 264, 226; 358/3.06, 447, 463; 341/79

(56) References Cited

U.S. PATENT DOCUMENTS

| | | | |
|---|---|---|---|
| 4,447,830 A | 5/1984 | Stoffel | 358/462 |
| 5,535,013 A | 7/1996 | Murata | 382/239 |
| 5,799,112 A | 8/1998 | de Queiroz et al. | 382/254 |
| 5,828,782 A | 10/1998 | Sunakawa et al. | 382/173 |
| 6,172,769 B1 * | 1/2001 | Rao et al. | 358/1.9 |
| 6,172,770 B1 * | 1/2001 | Inoue | 358/3.06 |
| 6,195,456 B1 * | 2/2001 | Balasubramanian et al. | 382/167 |

OTHER PUBLICATIONS

IEEE Transactions on Signal Processing, vol. 46, No. 4, Apr. 1998 pp 1179–1184.
Li et al., "Text and Picture Segmentation by the Distribution Analysis of Wavelet Coefficients", 1998 IEEE.
Luo et al., "A Robust Technique for Image Descreening Based on the Wavelet Transform", IEEE Transactions on Signal Processing, vol. 46, No. 4, Apr. 1998.

* cited by examiner

*Primary Examiner*—Daniel Mariam
(74) *Attorney, Agent, or Firm*—Fay, Sharpe, Fagan, Minnich & McKee, LLP

(57) ABSTRACT

A method of detecting halftones in the wavelet domain includes determining an energy value for the sub-bands in a wavelet decomposition. The calculated energy values are compared to a model of energy values that are expected when halftone data are not present. If the actual energy values do not conform to the model, halftone data are deemed to be present. In one embodiment, the model defines a pattern of decaying sub-band energy for each sub-band moving from a highest level of the wavelet decomposition to the lowest level of the decomposition. In another embodiment, the expected energy values in the model vary depending upon the bit-rate of compression of the wavelet-domain data.

15 Claims, 5 Drawing Sheets

HALFTONE DETECTION IN THE WAVELET DOMAIN

BACKGROUND OF THE INVENTION

The present invention relates to the digital image processing arts. More particularly, the present invention relates to a method for detecting halftones in the wavelet domain. The method is employed in a compression encoding procedure to trigger a descreening process (in the wavelet domain) whereby the halftone data are descreened prior to the compression process to increase compression. The method is also employed in a decompression decoding procedure to trigger the descreening process during image reconstruction to improve the quality of the reconstructed image.

The representation of digital image data in the wavelet domain is well known. Wavelet-based data compression schemes are also known and are expected to become increasingly popular. For example, JPEG 2000 is a newly developed wavelet-based data compression scheme that is expected to be widely implemented in the digital image processing arts.

It has been found that the presence of halftone image data in a digital image is disruptive to wavelet-based compression methods. Thus, halftone image data cannot be compressed as efficiently. Likewise, reconstruction of an image from compressed data that contains halftones results in a reconstructed image of sub-optimal quality.

SUMMARY OF THE INVENTION

In accordance with the present invention, an image processing method comprises receiving wavelet-domain data defining a digital image. The wavelet-domain data are processed in the wavelet domain to determine if halftone data are present in the wavelet-domain data. A descreening process, preferably a wavelet-domain process, is activated if halftone data are present in the wavelet domain data.

The method of detecting halftones in the wavelet domain includes determining an energy value for the sub-bands in a wavelet decomposition. The calculated energy values are compared to a model of energy values that are expected when halftone data are not present. If the actual energy values do not conform to the model, halftone data are deemed to be present. In one embodiment, the model defines a pattern of decaying sub-band energy for each sub-band moving from a highest level of the wavelet decomposition to the lowest level of the decomposition. In another embodiment, the expected energy values in the model vary depending upon the bit-rate of compression of the wavelet-domain data. If desired, violations of the model can be counted based upon the quantity and/or the magnitude thereof.

One advantage of the present invention resides in the provision of a method for detection of halftone image data in the wavelet domain.

Another advantage of the present invention is found in the provision of a method for detection of halftone image data in the wavelet domain wherein a wavelet-based halftone descreening method is triggered in response to detection of halftone data.

Another advantage of the present invention resides in the provision of a method for detection of halftone image data in the wavelet domain wherein the method is employed upstream and/or downstream from a wavelet-based image compressor to trigger descreening prior to compression or during image reconstruction.

A further advantage of the present invention results from the provision of a method for detecting halftones in the wavelet domain wherein halftone detection is based upon the absence of a preferred energy pattern in the wavelet sub-band data.

A yet further advantage of the present invention resides in the provision of a method for detecting halftone data in the wavelet domain wherein an expected energy pattern for the wavelet sub-band data is modeled and the actual energy pattern is compared to the model to determine if halftone data are present.

Still other benefits and advantages of the invention will become apparent to those of ordinary skill in the art to which the invention pertains upon reading and understanding this specification.

BRIEF DESCRIPTION OF THE DRAWINGS

The present invention comprises various steps and arrangements of steps, preferred embodiments of which are illustrated in the accompanying drawings that form a part hereof and wherein.

DETAILED DESCRIPTION OF THE PREFERRED EMBODIMENT

Figure 1:
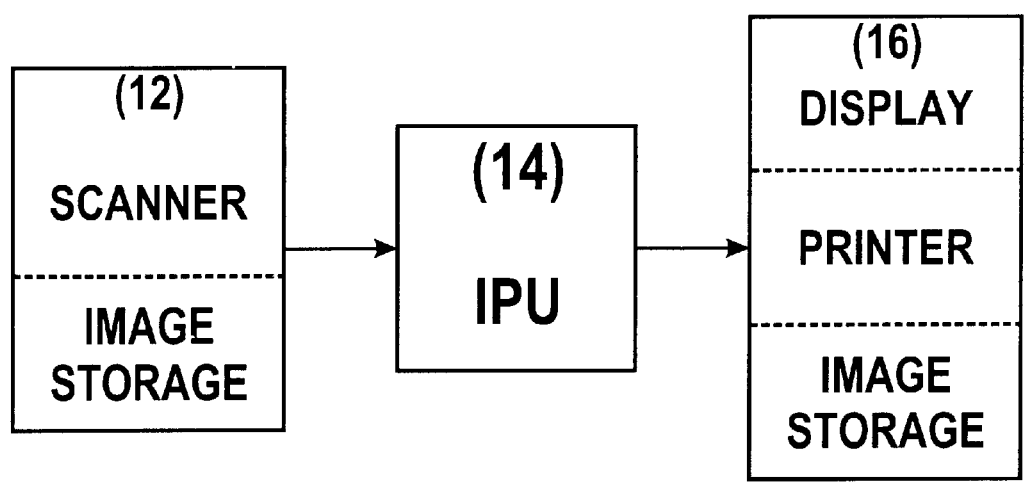
FIG. 1 is a diagrammatic illustration of a digital image processing apparatus adapted for implementing a method for detection of halftone data in the wavelet domain in accordance with the present invention.

Referring now to the drawings wherein the showings are for purposes of illustrating a preferred embodiment of the invention only and not for limiting the invention in any way, FIG. 1 diagrammatically illustrates an image processing apparatus adapted for implementing a method for detection of halftone image data in the wavelet domain in accordance with the present invention. In this example, the image processing apparatus comprises an image input terminal 12, an image processing unit 14, and an image output terminal 16. The input terminal can be any source of digital image data including a scanner or a source of stored image data. The image processing unit (IPU) is provided by any suitable electronic computing apparatus including a microprocessor or the like for carrying out digital image processing as described herein. Image data from the input terminal 12 are supplied to the IPU 14 for processing. After processing the data, the IPU 14 outputs the data to the image output terminal 16 that comprises a non-impact printer, video display, image storage device or the like. Suitable image processing apparatus including an input terminal 12, an image processing unit 14 and an image output terminal 16 are provided by digital xerographic image processing apparatus such as XEROX DocuTech document reproduction system or a conventional computer including a scanner, and a printer operatively connected thereto.

The decomposition of a digital image into different frequency sub-bands or sub-band images using a discrete wavelet transform is well known. The discrete wavelet transform and its inverse transform are well-known and fully described in *Wavelets and Subband Coding*, Vetterli and Kovacevic, Prentice Hall PTR (1995); *Wavelets and Filter Banks*, Strang and Nguyen, Wellesley-Cambridge Press (1996); and, *Wavelet Basics*, Chan, Kluwer Academic Publishers (1995), each of which is hereby expressly incorporated by reference herein.

Figure 2:
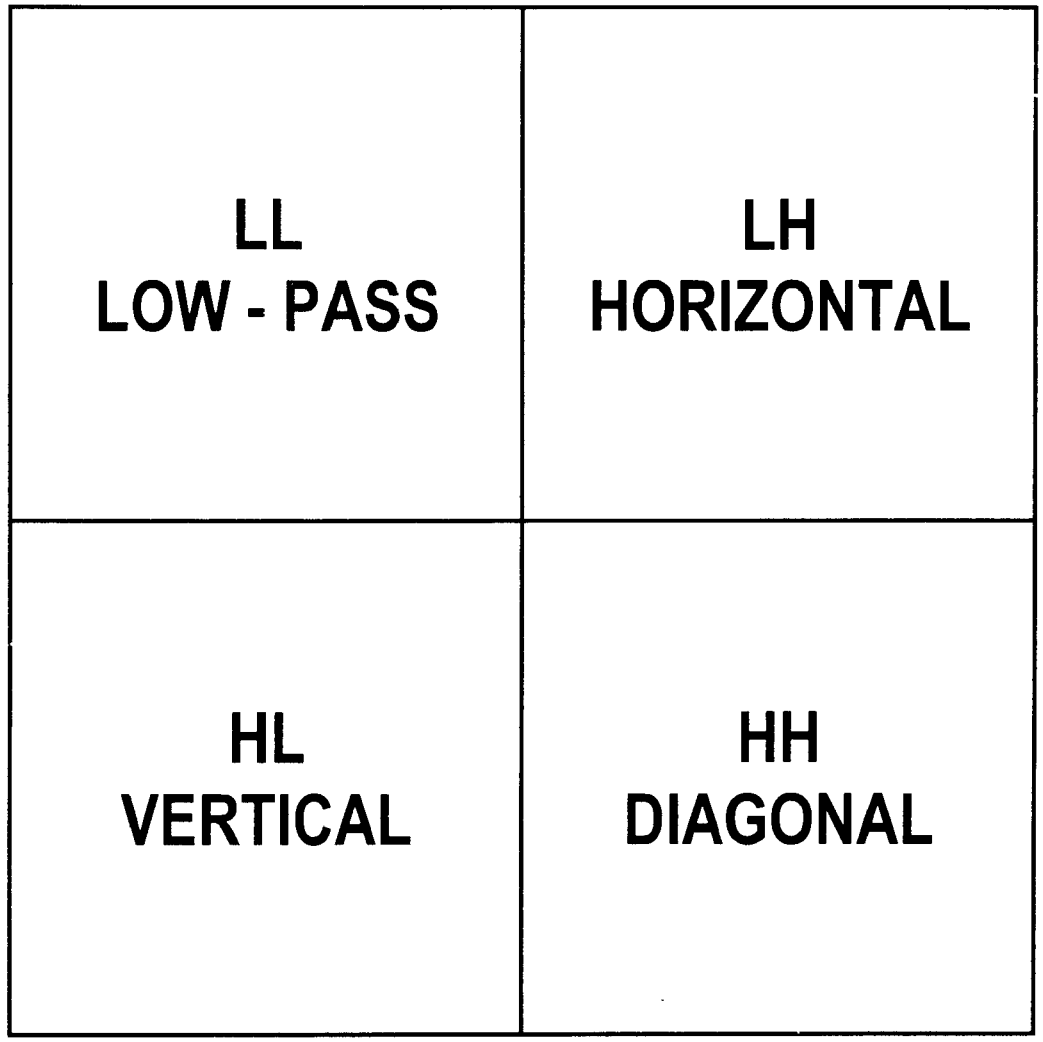
FIG. 2 is a diagrammatic illustration of a single-level wavelet decomposition of a digital image.

Referring now to FIG. 2, a one-level wavelet decomposition corresponding to an original digital image is illustrated. As is well known, the wavelet decomposition of a digital image comprises four sub-bands LL, LH, HL, HH. The low-pass sub-band LL is defined by a low-pass, sub-sampled version of the original image; the horizontal sub-band LH is defined by the high-frequency horizontal information in the original image; the vertical sub-band HL is defined by the high-frequency vertical information in the original image; and the diagonal sub-band is defined by the high-frequency diagonal information in the original image.

Figure 3:
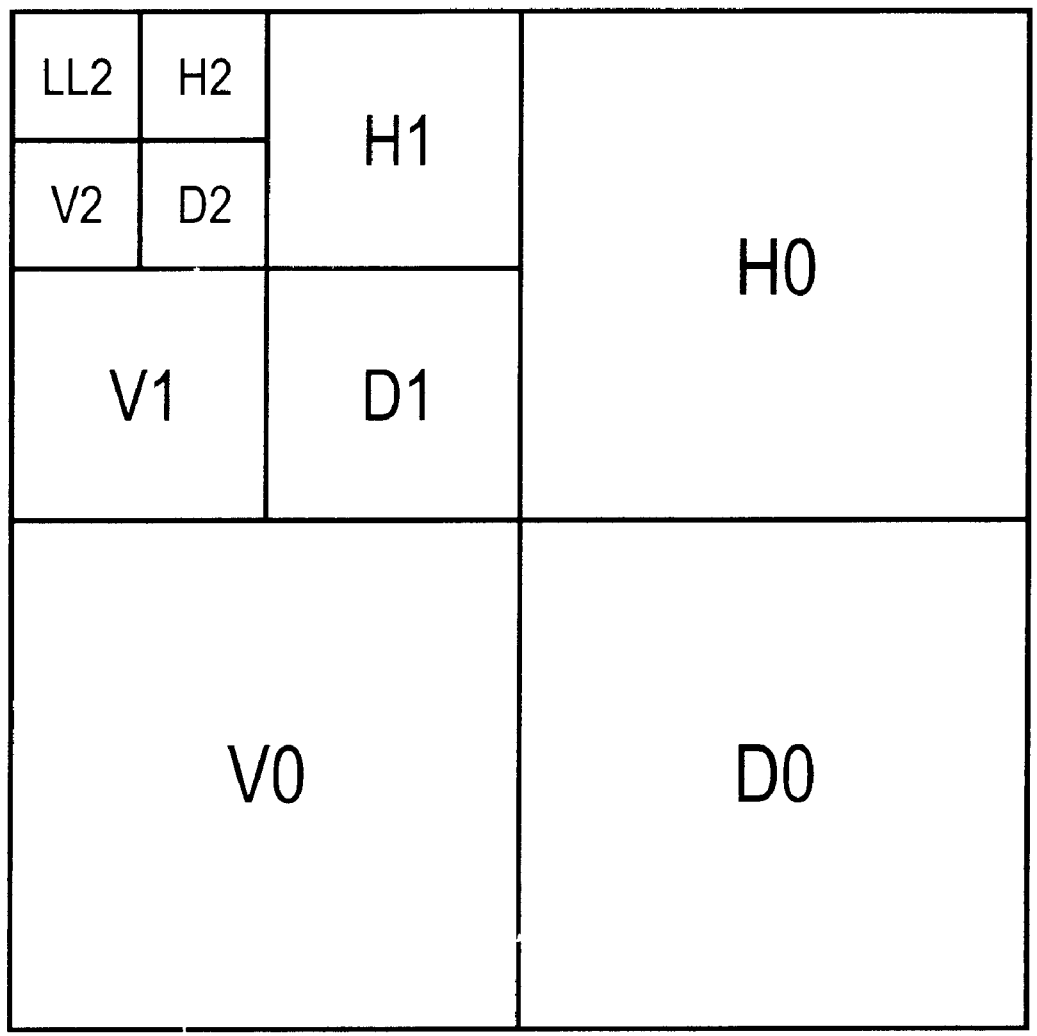
FIG. 3 is a diagrammatic illustration of multiple-level (i.e., 3 level) wavelet decomposition of a digital image.
Figure 4:
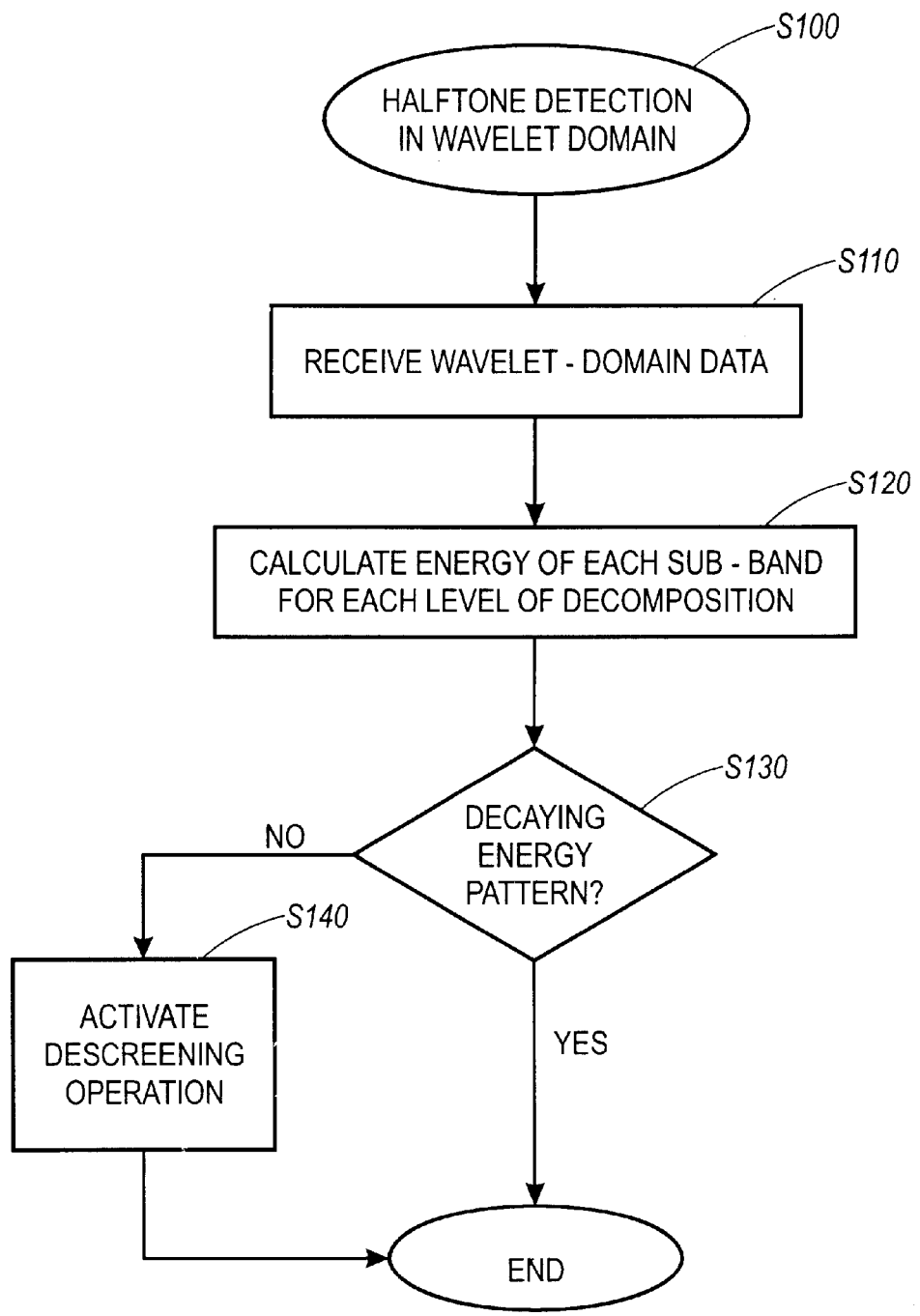
FIG. 4 is a flow chart that discloses a wavelet-domain halftone detection method in accordance with a first embodiment of the present invention; and, FIG. 5 is a flow chart that discloses a wavelet-domain halftone detection method in accordance with a second embodiment of the present invention.

Referring now to FIG. 3, the first level wavelet decomposition of the original image comprises a horizontal sub-band H0, a vertical sub-band V0 and a diagonal sub-band D0 as described above. The low-pass sub-band, itself, has been subjected to a wavelet decomposition so that a second-level of sub-bands H1, V1, D1 are defined. Here, again, the second-level low-pass sub-band has been subjected to a wavelet decomposition so that a third level of wavelet sub-bands is defined by a third-level low-pass sub-band LL2, a third-level horizontal sub-band H2, a third-level vertical sub-band V2 and a third-level diagonal sub-band D2. The wavelet decomposition can be repeated further if desired.

Each sub-band of each wavelet decomposition level is defined by a Nr rows and Nc columns of coefficients Sij wherein $0 \leq i < Nr$ and $0 \leq j < Nc$. A sub-band having a large number of zero coefficients is said to have less energy than a sub-band having a large number of non-zero coefficients. In one example, the energy $E_B$ of a sub-band B is calculated as the average of all coefficients in the sub-band according to:

$$E_B = \sum_{ij \in B} |S_{ij}| \div (Nr * Nc)$$

It is known to compress image data after it has been decomposed in the wavelet domain. Image data compression schemes such as JPEG 2000 rely upon wavelet decomposition to achieve very high compression ratios. It is also known that higher compression ratios and better data decompression and image reconstruction are achieved when the image data does not include halftone data. Commonly assigned U.S. Pat. No. 5,799,112 to de Queiroz et al. discloses a method for descreening image data in the wavelet domain to remove the effects of the halftoning operation and obtain continuous tone image data. When employed upstream from an image data compression operation the descreening operation improves the image compression ratio. When employed downstream from an image decompression operation, the descreening operation improves image reconstruction. U.S. Pat. No. 5,799,112 is hereby expressly incorporated by reference herein.

Heretofore, there has been no effective method for observing image data in the wavelet domain (i.e., without performing an inverse discrete wavelet transform) and determining if the data include halftone data so that descreening can be carried out. The present invention is directed to such a method.

FIG. 3 discloses a method S100 for halftone detection in the wavelet domain in accordance with the present invention. The method comprises a step S110 of receiving wavelet-domain data for a digital image. A step S120 calculates the energy of each sub-band for each level of decomposition represented in the wavelet-domain data. A step S130 determines if the energy of each sub-band decays according to a predefined pattern moving toward the lowest-level (highest-frequency) decomposition. Specifically, it has been determined that, for corresponding sub-bands in the various levels of a wavelet decomposition, the energy of the sub-bands should decrease as the decomposition level decreases if halftone data are not present in the wavelet-domain data, i.e., with reference to FIG. 3, the energy of the sub-band D0 should be less than the energy of the sub-band D1, and the energy of the sub-band D1 should be less than the energy of the sub-band D2 if halftone data are not present. It has been found that wavelet decomposition of an image including halftone data results in an energy pattern that does not decay in this fashion. Instead, when halftone data are present in the wavelet decomposition, at least some of the high frequency sub-bands will possess higher energy than corresponding lower-frequency sub-bands.

If the step S130 determines that the predefined decaying energy pattern is not present, a step S40 is carried out to descreen the wavelet-domain data. Most preferably, the descreening operation is also carried out in the wavelet domain using an operation such as that disclosed in U.S. Pat. No. 5,799,112 or a similar method. If the step S130 determines that the expected decaying energy pattern is present, halftone data are not present and, thus, no descreening operation is carried out.

In accordance with another embodiment of the present invention, the expected (non-halftone) energy pattern for a wavelet decomposition is modeled based upon the amount of compression of the image data. In this case, the expected energy $\hat{E}$ for a sub-band X in a level k−1 of the wavelet decomposition is based upon a conditioning parameter alpha $\alpha$ multiplied by the expected energy $\hat{E}$ for the same sub-band X in the next-highest level k of the wavelet decomposition as specified by the equation:

$$\hat{E}_{X_{k-1}} = \alpha \hat{E}_{X_k}$$

Thus, where X is any sub-band (horizontal, vertical, diagonal), $\hat{E}_{X_n}$ is the expected energy value for that sub-band at level n of the wavelet decomposition, given the energy of the corresponding sub-band at level n+1. The number of levels in the decomposition is expressed as N. Thus, $\hat{E}_{X, N-1} = E_{X, N-1} E_X$. The modeled energy values therefore are $\hat{E}_{X_n} = \alpha^{N-1-n} E_X$. With this in mind it can be seen that, for each sub-band X, once the energy for the highest-level (e.g., level 2) is calculated, the expected energies $\hat{E}$ for all of the lower-levels of the same sub-band X (e.g., levels 1, 0) can be calculated to derive a model of energy decay that is expected when no halftone data are present. Of course, the model is based upon the conditioning parameter alpha $\alpha$.

In accordance with the present invention, the conditioning parameter $\alpha$ is varied based upon the amount of compression in the wavelet domain expressed in terms of bits per pixel (bpp). Specifically, as the bit rate decreases (greater compression) the conditioning parameter $\alpha$ also decreases. As the bit rate increases (less compression) the conditioning parameter $\alpha$ also increases. Thus, it can be seen that as the bit rate increases when the image has been less compressed, the expected energy for a sub-band based upon the above modeling is greater. Conversely, when an image is compressed to a greater degree (lower bit rate), the conditioning parameter α is lower and the expected energy of each sub-band according to the model is lower. This is due to the fact that a greater amount of compression resulting from a lower bit rate, itself, eliminates halftone data.

Using the foregoing modeling technique, a violation value K can be determined and compared to a threshold T of maximum allowed model violations. The violation value K is defined as the number of occurrences of an actual energy value $E_X$ of a sub-band X being greater than the expected energy value $\hat{E}_X$ of that sub-band. If the number of violations K is greater than the threshold T, it will be apparent that the actual energy pattern of the wavelet decomposition is not conforming to the model and halftone data are present in the wavelet-domain data. This can be expressed according to the following equation:

$$K = \sum_{n=0}^{N-1} \sum_{X=H,D,V} u(E_{Xn} - \hat{E}_{Xn}) = \sum_{n=0}^{N-1} \sum_{X=H,D,V} u(E_{Xn} - \alpha^{N-1-n} E_X) > T$$

where u(t) is a step function, i.e., u(t)=0, t≦0; otherwise u(t)=1. So, K is a measure of how many times the energy of a sub-band exceeds the expected energy of that sub-band as calculated according to the model. K is a measure of violations of the model and this value is compared to the threshold T that determines if the image data includes halftone data or not. Specifically, if the number of violations K exceeds the threshold T, the image is said to contain halftone data.

Those of ordinary skill in the art will recognize that the values T and α can be varied without departing from the overall scope and intent of the present invention. In one embodiment, T=5 and α=0.4+0.6R, where R is the compression bit-rate expressed in terms of bits per pixel (bpp) has been found to be preferred.

Figure 5:
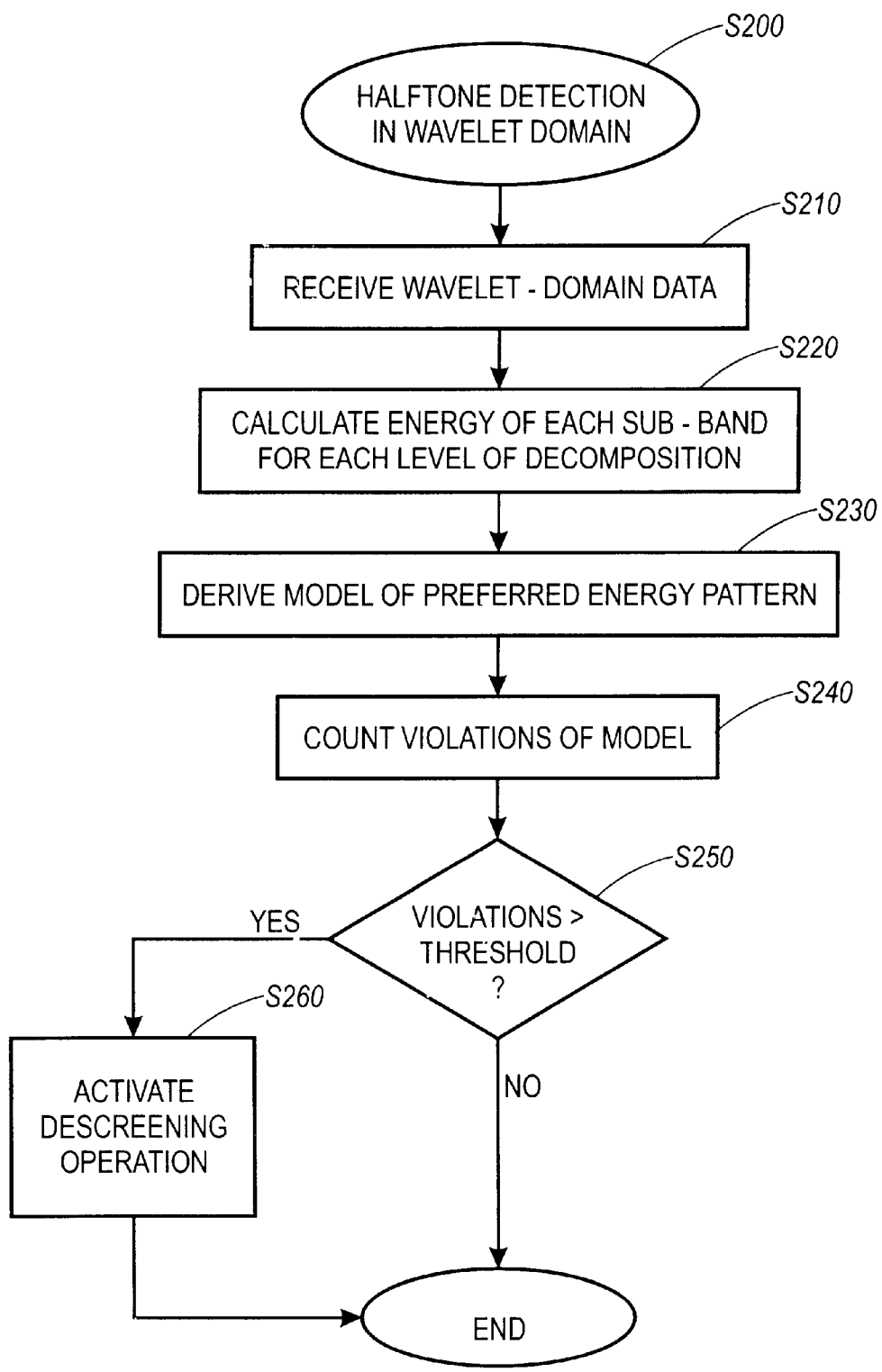

FIG. 5 discloses a method S200 for halftone detection in the wavelet domain in accordance with the foregoing alternative embodiment. The method S200 includes a step S210 that receives the wavelet-domain data defining an image. A step S220 calculates the energy of each sub-band for each level of decomposition in the wavelet-domain data. A step S230 derives the model of expected sub-band energies Ê for each sub-band based upon α. A step S240 determines the number of violations K of the model as described above. A step S250 determines if the number of violations K is greater than the threshold T. If not, no halftone data are present and the process is complete. If K>T according to step S250, halftone data are deemed to be present and a step S260 is carried out to activate a descreening process, preferably in the wavelet domain as in the aforementioned U.S. Pat. No. 5,799,112.

As an alternative to the foregoing modeling technique, the magnitude of each violation of the model of expected energies can be used in the calculation of K to ensure that large violations have a more significant impact on the value of K relative to small violations. In this case, K can be calculated and compared to the threshold T according to:

$$K = \sum_{n=0}^{N-1} \sum_{X=H,D,V} u(E_{Xn} - \alpha^{N-1-n} E_X) * (E_{Xn} - \alpha^{N-1-n} E_X) * W_{Xn} > T$$

again, where u(t) is a step function, i.e., u(t)=0, t≦0; otherwise u(t)=1; $W_{Xn}$ are weight values that control the influence that the violation magnitude has on K based upon the sub-band $X_n$. Here, K is based upon both the number of violations and magnitude thereof. K is again compared to the threshold T to determine if the image data includes halftone data or not. Specifically, if K exceeds the threshold T, the image is said to contain halftone data. Of course, those of ordinary skill in the art will recognize that the magnitude of the violations of the model can be summed and the total compared to a maximum violation value, without regard to the number of violation occurrences.

Modifications and alterations will occur to those of ordinary skill in the art to which the invention pertains upon reading this specification. It is intended that all such alterations and modifications fall within the scope of the invention as defined by the following claims as construed literally or according to the doctrine of equivalents.

Having thus described the preferred embodiments, what is claimed is:

1. An image processing meted comprising:

receiving wavelet-domain data defining a digital image;

processing said wavelet-domain data in the wavelet domain to determine if halftone data are present in said wavelet-domain data, wherein said step of processing said wavelet-domain data comprises:

determining an energy of each sub-band of each level of decomposition represented in said wavelet-domain data;

for corresponding sub-bands in each of the levels of decomposition, determining the presence of halftone data in the wavelet-domain data if the energy of the sub-bands does not decay moving from a highest level sub-band to a lowest level sub-band;

activating a descreening process if halftone data are present in said wavelet domain data.

2. The image processing method as set forth in claim 1, wherein said step of processing said wavelet-domain data comprises:

deriving a model of expected energy for sub-bands represented in the wavelet-domain data;

determining if said wavelet-domain data conform to said model;

if said wavelet-domain data do not conform to said model, determining the presence of halftone data in said wavelet-domain data.

3. The image processing method as set forth in claim 2, wherein said step of determining if said wavelet-domain data conform to said model comprises:

tracking a number of violations representing occurrences of said wavelet-domain data violating said model;

comparing said number of violations to a threshold T;

determining the presence of halftone data in said wavelet-domain data if said number of violations exceeds said threshold T.

4. The image processing method as set forth in claim 3, wherein T=5.

5. The image processing method as set forth in claim 2 wherein said model of expected energy varies depending upon compression of said wavelet-domain data.

6. The image processing method as set forth in claim 1, wherein said descreening process is a wavelet-domain descreening process.

7. A wavelet-domain image processing method comprising:

receiving wavelet-domain data defining an N-level wavelet decomposition of a digital image, each of level n=1 to N of said decomposition including a horizontal sub-band H, a vertical sub-band V and a diagonal sub-band D;

deriving a model of expected energy values Ê for each sub-band H,V,D in each level not said wavelet decomposition, said expected energies derived according to:

$$\hat{E}_{Xk-1} = \alpha \hat{E}_{Xk}$$

wherein X=H,D,V and k=1 to N; and, wherein α is conditioning parameter that varies depending a bit rate at which said wavelet-domain data are compressed;

determining an actual energy for each sub-band H,V,D of each level a of said wavelet decomposition defined by said wavelet-domain data;

comparing each actual energy value to a corresponding expected energy of said model to determine if said actual energy value exceeds said expected energy value;

tracking a number of occurrences that an actual energy value exceeds an expected energy value;

comparing said number of occurrences to a select threshold; and, determining that halftone data are present in said wavelet-domain data if said number of occurrences exceeds said threshold.

8. The wavelet-domain image processing method as set forth in claim 7, wherein α increases when a bit-rate at which said wavelet-domain data are compressed increases, and wherein α decreases when a bit-rate at which said wavelet-domain data are compressed decreases.

9. The wavelet-domain image processing method as set forth in claim 8, wherein α=0.4+0.6R, wherein R is the bit-rate of compression expressed in terms of bits per pixel.

10. The wavelet-domain image processing method as set forth in claim 7, wherein said threshold equals 5.

11. The wavelet-domain image processing method as set forth in claim 7, wherein each of said sub-bands defined in said wavelet domain data comprises a plurality of coefficients, and wherein said actual energy of a sub-band is calculated as an average of said plurality of coefficients.

12. In a xerographic or other non-impact printing environment, a wavelet-domain image processing method comprising:

receiving wavelet-domain data defining a wavelet decomposition of a digital image;

determining an energy value for sub-bands of said wavelet decomposition;

for a plurality of said sub-bands of said wavelet decomposition, comparing said energy value of said sub-band to an expected energy value for that sub-band to determine if said wavelet-domain data conform to a model of expected sub-band energy values;

if said wavelet-domain data do not conform to said model of expected sub-band energy values, identifying said wavelet-domain data as including halftone data.

13. The method as set forth in claim 12, wherein said model of expected sub-band energy values defines a pattern of decaying energy for each sub-band of said wavelet decomposition moving from a highest level of said decomposition to a lowest level of said decomposition.

14. The method as set forth in claim 12, wherein said step of determining if said wavelet-domain data conform to said model comprises:

for each occurrence of a sub-band energy exceeding a corresponding expected sub-band energy, counting a violation of said model;

comparing a total number of violations to a maximum violation threshold; and, identifying said wavelet-domain data as including halftone data when said total number of violations exceeds said maximum violation threshold.

15. The method as set forth in claim 12, wherein said step of determining if said wavelet-domain data conform to said model comprises:

for each occurrence of a sub-band energy exceeding a corresponding expected sub-band energy by a violation amount, increasing a total violation value based upon said violation amount;

comparing said total violation value to a maximum violation value; and, identifying said wavelet-domain data as including halftone data when said total violation value exceeds said maximum violation value.

\* \* \* \* \*